United States Patent [19]

Hammond et al.

[11] Patent Number: 5,668,587

[45] Date of Patent: Sep. 16, 1997

[54] AUTOMATIC LED PRINTBAR UNIFORMITY AND ADJUSTMENT

[75] Inventors: Thomas J. Hammond, Penfield; George A. Charnitski, Fairport, both of N.Y.

[73] Assignee: Xerox Corporation, Stamford, Conn.

[21] Appl. No.: 514,033

[22] Filed: Aug. 11, 1995

Related U.S. Application Data

[63] Continuation-in-part of Ser. No. 205,425, Mar. 4, 1994, abandoned.

[51] Int. Cl.$^6$ .................. B41J 2/435; B41J 2/45
[52] U.S. Cl. .................. 347/237; 347/238; 347/130; 347/132
[58] Field of Search .................. 347/237, 236, 347/238, 130, 132, 133; 358/296, 300, 302

[56] References Cited

U.S. PATENT DOCUMENTS

| | | | |
|---|---|---|---|
| 4,525,729 | 6/1985 | Agulnek et al. | 347/237 |
| 4,689,694 | 8/1987 | Yoshida | 358/298 |
| 4,706,130 | 11/1987 | Yamakawa | 358/296 |
| 4,799,071 | 1/1989 | Zeise et al. | 347/238 X |
| 4,882,621 | 11/1989 | Suzuki et al. | 358/518 |
| 4,982,203 | 1/1991 | Uebbing et al. | 347/236 |
| 5,016,027 | 5/1991 | Uebbing | 347/236 |
| 5,025,322 | 6/1991 | Ng | 358/298 |
| 5,126,759 | 6/1992 | Small et al. | 347/237 |
| 5,138,337 | 8/1992 | Ng | 347/237 |

FOREIGN PATENT DOCUMENTS 3-120059   5/1991   Japan .................. 347/237

*Primary Examiner*—David F. Yockey
*Attorney, Agent, or Firm*—John M. Kelly

[57] ABSTRACT

Uniformity light output of an LED printbar is achieved by a technique which senses the operational on time of each LED. When the on time difference between the LED with the longest on time and the LED with the shortest on time exceeds a predetermined value, the outputs of at least some LEDs comprising the printbar are compensated for to normalize their light output. This normalization is achieved via a drive circuit which drives each LED based upon correction data, and by determining an update of the correction data based upon the difference between the on time of individual LEDs. The correction data is determined when the difference between the on time of the LED with the longest on time and the on time of the LED with the shortest on time exceeds a predetermined maximum difference.

1 Claim, 3 Drawing Sheets

AUTOMATIC LED PRINTBAR UNIFORMITY AND ADJUSTMENT

This application is a continuation-in-part of application Ser. No. 08/205,425, filed on 4 Mar. 1994, abandoned.

FIELD OF THE INVENTION

The present invention relates generally to LED printbars such as those used in xerographic or digital printer systems. More particularly, the present invention relates to an improved apparatus and method for maintaining LED printbar uniformity throughout the operating life of the printbar.

BACKGROUND OF THE INVENTION

Printbars which are used in image recording systems are well known in the art. Such printbars are generally comprised of a linear array of discrete, light-emitting sources. Examples of printbars include wire dot, electrostatic, ink jet, and thermal printheads. Light emitting diode (LED) printbars are commonly used because of their high resolution, which is obtained by arranging a large number of closely spaced LEDs in a linear array. By providing relative motion between the LED printbar and a photoreceptor, and by selectively energizing the LEDs at the proper times, a desired latent electrostatic image can be produced on the recording member. The production of a desired latent image is usually performed by having each LED expose a corresponding pixel on the recording member in accordance with image-defining video data information applied to the printbar through driver circuitry. Conventionally, digital data signals from a data source, which may be a Raster Input Scanner (RIS), a computer, a word processor or some other source of digitized image data is clocked into a shift register. Some time after the start of a line signal, individual LED drive circuits are then selectively energized to control the on/off timing of currents flowing through the LEDs. The LEDs selectively turn on and off to form a line exposure pattern on the surface of the photoreceptor. A complete image is formed by successive line exposures. U.S. Pat. Nos. 4,689,694; 4,706,130; 5,138,337 and 5,126,759 are representative of prior art printhead control circuitry. Prior art exposure control systems are disclosed in U.S. Pat. Nos. 4,525,729, and 5,025,322. Those prior art references are hereby incorporated by reference.

To create high quality images using an LED printbar, each of the LEDs should output the same amount of light when activated. To meet current copy quality goals, the printbar light output uniformity must be within plus or minus 1 or 2%. It is known in the prior art to correct printbar LED outputs to this level during an initial calibration procedure. A correction matrix of light output values for each pixel is created and stored in a memory on the printbar. Those values are downloaded to correction circuitry each time the printer is to be used. The correction circuitry compensates for light output differences by controlling the electrical signals to the LEDs.

However, the LEDs may have different aging characteristics which will eventually result in pixel-to-pixel nonuniformity. To a first approximation, a decrease in an individual LED's light output is a simple function of the LED's accumulated on time. A prior art solution to the aging problem is to provide a photosensor on the printbar. That photosensor is then periodically scanned across the printbar as each pixel is individually turned on. The light intensity of each pixel is determined and, if necessary, the outputs from various LEDs are adjusted. While this system is beneficial in compensating for aging, it is rather expensive and uses valuable space near the photoreceptor. Other solutions to the aging problem are described in U.S. Pat. Nos. 5,016,027 and 4,982,203. However, those methods may not be optimal. Therefore, a new method of maintaining pixel-to-pixel exposure uniformity would be useful.

SUMMARY OF THE INVENTION

The principles of the present invention can be used to maintain pixel-to-pixel exposure uniformity in printers which uses an LED printbar. Initial calibration data for each LED is determined and stored in a correction memory. The contents of the correction memory are used to control the illumination from the LEDs. During printing, the on time of each LED is accumulated in an exposure counter. Periodically, the on times of the LEDs accumulated in the exposure counter are compared. When the difference between the LED with the longest on time and the LED with the shortest on time exceeds a predetermined value, new calibration data is determined for each LED using a correction formula. The new calibration data are then stored in the correction memory.

DESCRIPTION OF THE INVENTION

The improved electronic LED control architecture disclosed in the present invention can be used in digital printing environments such as shown, for example, in co-pending application Ser. No. 08/181,547, filed Jan. 14, 1994, abandoned and in U.S. Pat. No. 4,689,694, both of which are hereby incorporated by reference. The printbar uniformity correction techniques of the present invention can, however, be used to correct printbars in other types of usage environments.

Figure 1:
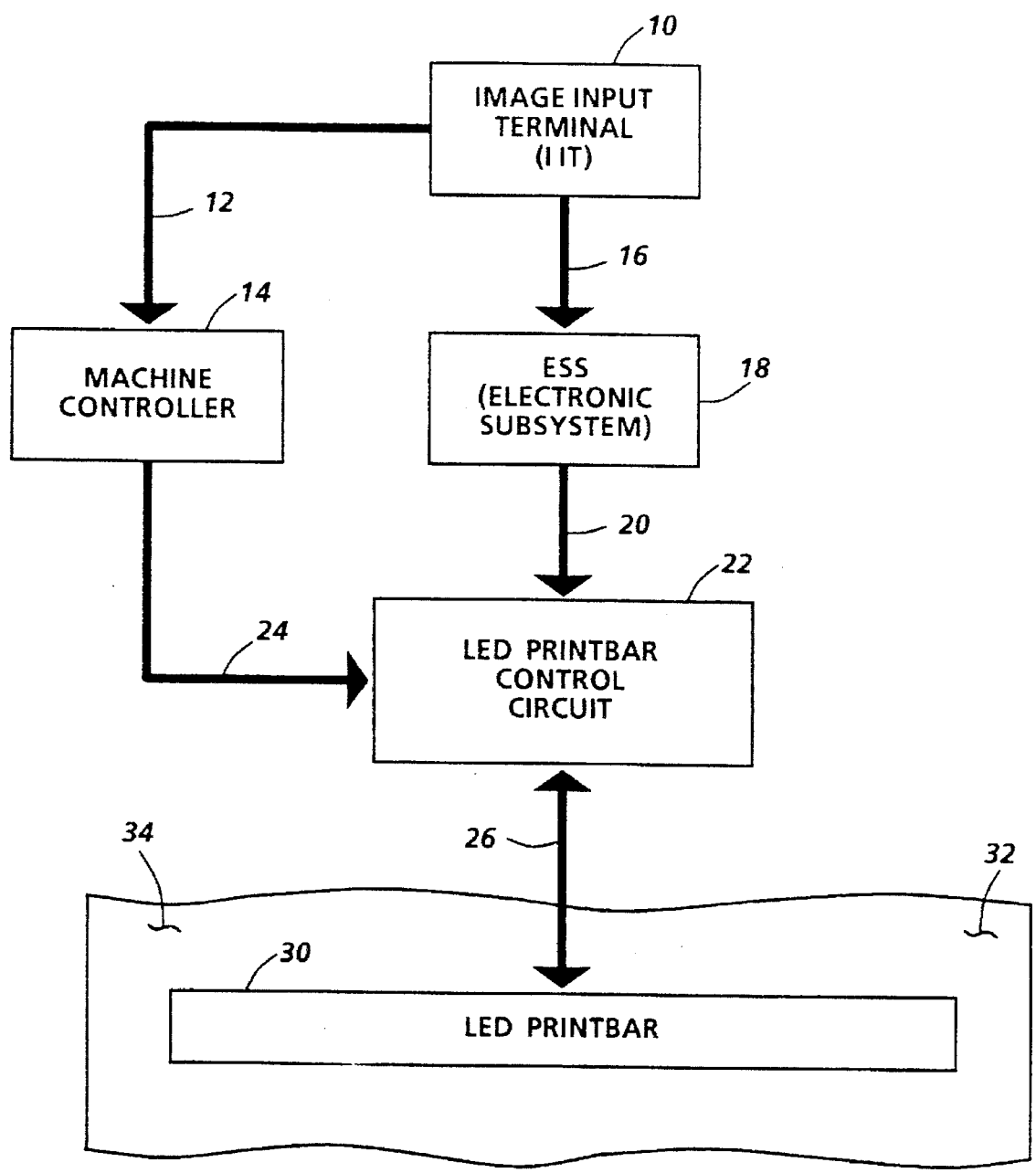
FIG. 1 is a block diagram of a data flow architecture for an LED printer which is in accord with the principles of the present invention.

FIG. 1 shows a block diagram for a data flow architecture that is used to control the printhead operation of a typical LED printer. A digital representation of an image to be printed is output from an image input terminal (IIT) 10 over a bus 12 to a machine controller 14 and over a bus 16 to an electronic subsystem (ESS) 18. The image input terminal may take the form of a Raster Input Scanner (RIS), a computer, a word processor or some other source of digitized image data. Based upon the data received and upon an operating mode selected by an operator, the machine controller 14 controls various user interfaces and the general operation of the LED printer, including positioning a photoreceptor relative to a printhead. The image signals applied to the ESS 18 are processed and stored in a predetermined format which is suitable for use when printing an image. As required, the ESS outputs digital image signals over a bus 20 to an LED printbar control circuit 22. Additionally, digital signals are fed over a bus 24 from the machine controller 14 to the LED printbar control circuit 22 to inform the LED printbar control circuit about the relative positions of an LED printbar to a photoreceptor.

Based upon the data represented by the applied digital image signals from the ESS, the LED Printbar Control Circuit performs further image processing, print data signal generation, strobe generation, and, as is subsequently described, exposure level control adjustments which correct for pixel-to-pixel uniformity. The LED printbar control circuit outputs print data signals, strobe signals, and as is subsequently explained, correction data signals, over a bi-directional bus 26 to a printbar 30. The print data signals are used to select the individual LED's of the printbar which are to illuminate the surface 32 of a photoreceptor 34. The strobe signals are used to synchronize the illumination positions with the relative motion of the photoreceptor. The correction data signals are used to normalize pixel exposure. Additionally, the LED printbar control circuit receives difference signals from the printbar over the bus 26. Those difference signals are used in a manner which is subsequently described.

Figure 2:
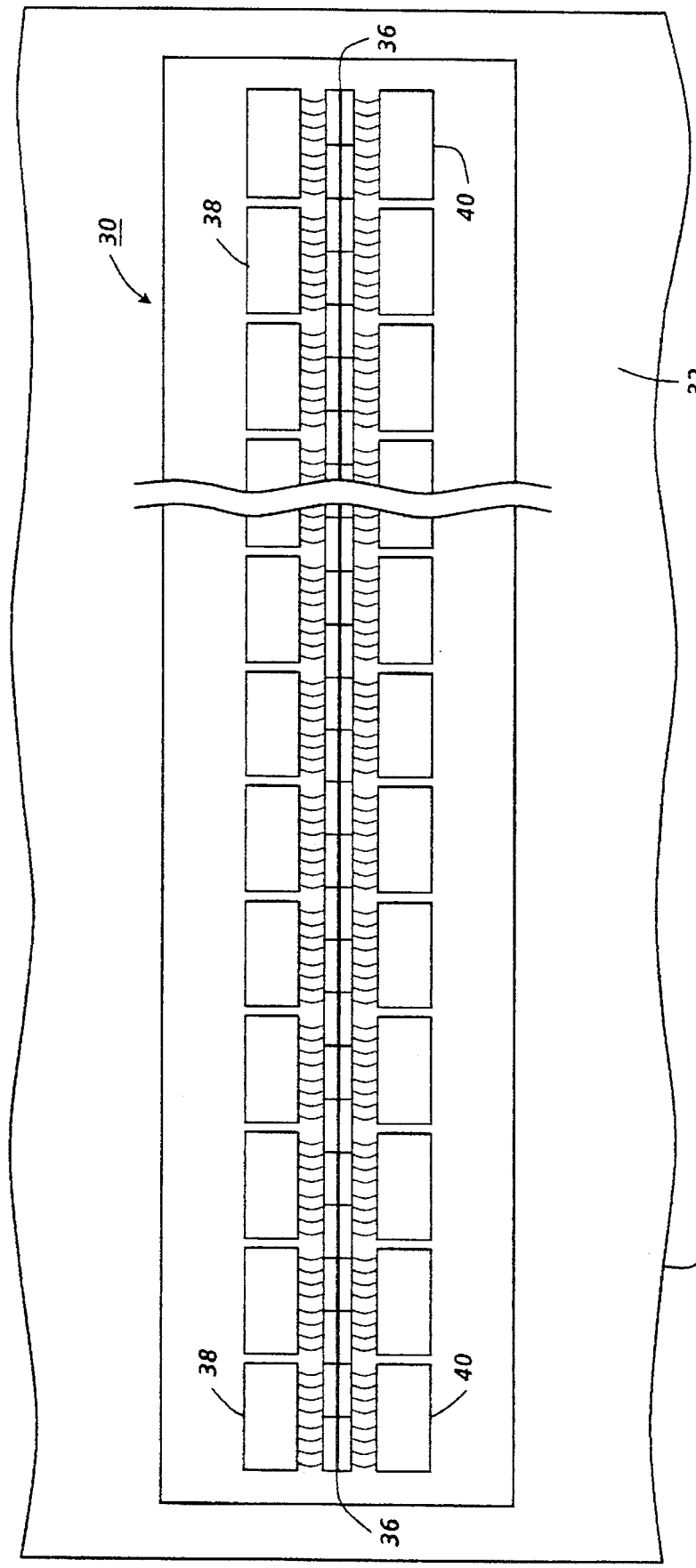
FIG. 2 is a top view an LED print head assembly which is suitable for practicing the present invention.

Referring now to FIG. 2, the printbar 30 comprises a suitable support with a series of LED chips 36 mounted thereon. For this example, there are thirty-two LED chips, with each chip having 128 LED's. Thus the printhead has a total of 4,096 LEDs. Each LED has a particular, approximately linear, response to input drive current. The LED chips 36 are arranged end-to-end in a row across the width of the photoreceptor 34. For each pair of LED chips, there is provided an LED Current Driver Network 38 and a Logic Network 40. Among other things, the Logic Network decodes the print data signals from the LED printbar control circuit to determine which LED is to turn on while the LED Current Driver Network drives each LED at the proper time with the proper drive current.

Figure 3:
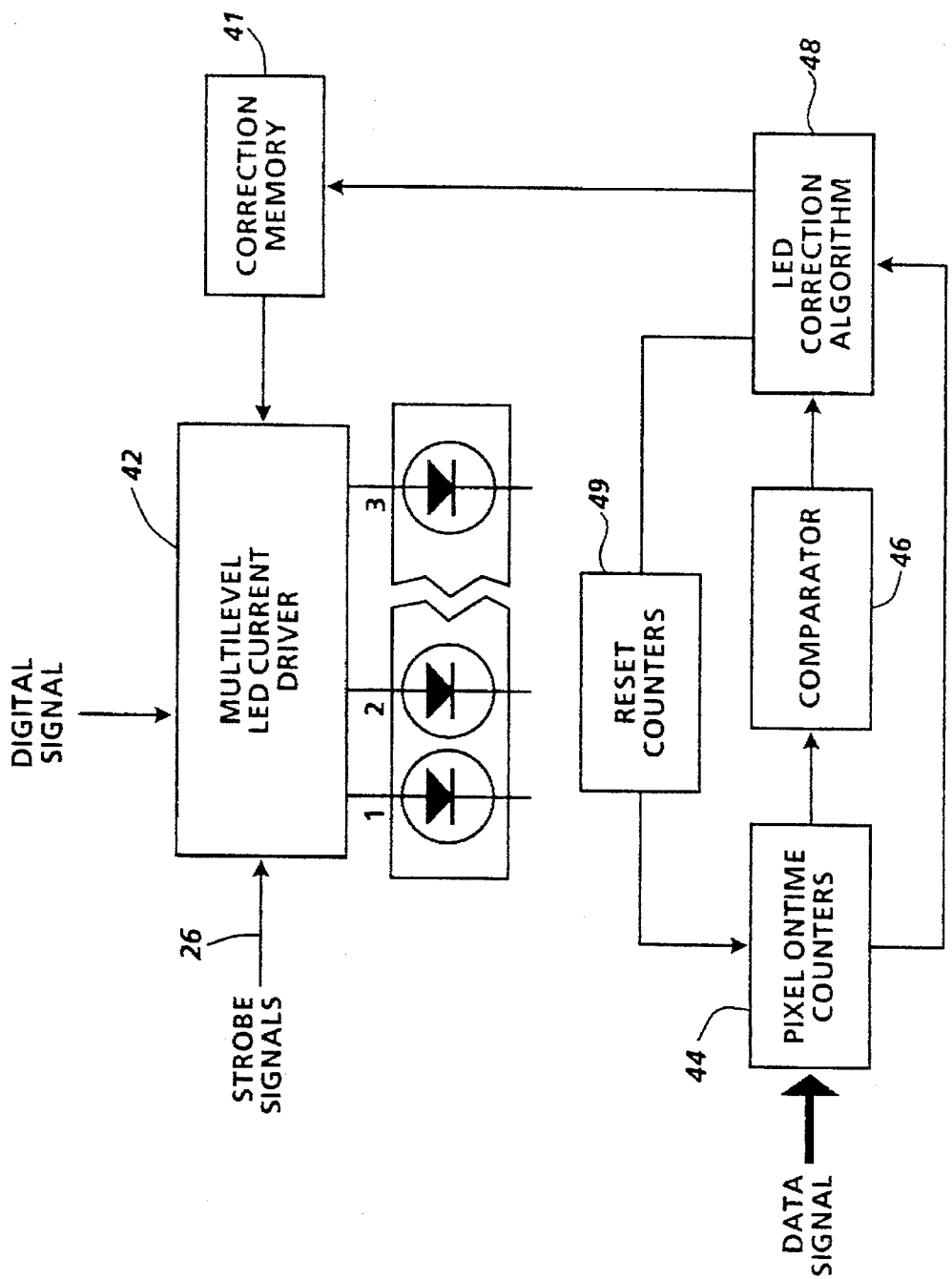
FIG. 3 is a block diagram of LED uniformity correction circuitry that is used in the LED printer according to FIG. 1.

The operational interaction of the LED Printbar Control Circuit 22 and the printbar 30 is explained with the assistance of FIG. 3. During an initial calibration, the light outputs of the various LEDs which comprise the printbar 30 are measured. From those measurements, correction data which is used to normalize the light output of each LED is determined and stored in a correction memory 41, which is a subsection of the LED Current Driver Network 38. By normalize, it is meant that each LED outputs about the same light intensity as the other LEDs in the printbar. At a suitable time, usually at machine power up, the stored correction values (which may be later altered by aging) are downloaded from correction memory 41 into a Multilevel LED Current Driver 42, which is also a part of the LED Current Driver Network 38. The correction data are used to select the current levels that are to be applied to the individual LEDs so that each LED outputs the same light intensity. When the relative position of the printbar 30 and the photoreceptor 34 is correct for a given line of data, the strobe signal on bus 26 causes the Multilevel LED Current Driver to attempt to drive each of the LEDs of the printbar.

Still referring to FIG. 3, contemporaneously with the strobe signal, the print data signals on the bus 26 are applied to pixel on time counters 44. Those counters accumulate the total number of times each LED of the printbar 30 has been turned on. Those counts represent the total on time of each of the LEDs. Periodically, such as after a predetermined number of strobe signals, a predetermined number of pages printed, a predetermined number of times the printer is turned on, or by using some other measure the total number of times each LED has been turned on is applied to a comparator 46. The comparator determines the difference between the on times of the LED with the longest on time and the LED with shortest on time. When that difference exceeds a maximum difference, the comparator 46 signals an LED correction algorithm circuit 48 to perform a recalibration of the correction data in the correction memory 41. Using a suitable algorithm that relates on time to light output drop the LED correction algorithm circuit 48 computes new correction data for each LED. Alternatively, only those LEDs with on times equal to or greater than the maximum difference are adjusted. Those computed values are then download to the correction memory as new correction data signals. The correction memory then replaces the prior correction data values with the new correction data values. At the same time the pixel on time counters 44 of the corrected LEDs are reset via reset counters 49. This correction process is then repeated throughout the LED printbar's useful life.

Details of charge, development, transfer and fusing using an LED type printer are disclosed in U.S. Pat. Nos. 3,850,517 and 4,831,395. The contents of these patents are hereby incorporated by reference.

While the embodiment disclosed herein is preferred, it will be appreciated from this teaching that various alternative modifications, variations or improvements therein may be made by those skilled in the art, which are intended to be encompassed by the following claims.

What is claimed is:

1. A method for correcting exposure non-uniformities in a printbar having a plurality of individual LEDs, said method comprising:

calibrating a printbar by determining a correction value for each corresponding one of the individual LEDs and storing each said determined correction value in a correction memory, each said correction value being a digital value for causing output of light of a substantially predetermined light intensity from the corresponding one of said individual LEDs;

determining an on time for each of the individual LEDs during a predetermined operational period;

determining a difference between the determined on time of an individual one of the LEDs having a greatest on time and the determined on time of an individual one of the LEDs having a shortest on time; and generating a new correction value for each of at least a portion of said LEDs and storing each said new correction value in the correction memory when the determined difference exceeds a predetermined maximum difference.

\* \* \* \* \*